United States Patent [19]
Cox, Jr.

[11] Patent Number: 5,619,847
[45] Date of Patent: Apr. 15, 1997

[54] DISPOSABLE LAWN MOWER BLADE

[76] Inventor: Clifton A. Cox, Jr., 4537 Auburn Ave., Ft. Myers, Fla. 33905

[21] Appl. No.: 568,828

[22] Filed: Dec. 7, 1995

[51] Int. Cl.⁶ .................................................. A01D 34/73
[52] U.S. Cl. ........................ 56/255; 56/295; 56/DIG. 20
[58] Field of Search ........................... 56/255, 295, 17.5, 56/DIG. 17, DIG. 20

[56] References Cited

U.S. PATENT DOCUMENTS 2,722,797  11/1955  Strattman ................................. 56/295
5,163,276  11/1992  Mohrman ............................. 56/295 X
5,259,176  11/1993  Kahamura et al. .................... 56/295 X Primary Examiner—Terry Lee Melius
Assistant Examiner—Heather Shackelford

[57] ABSTRACT

A disposable rotary lawn mower blade is made from a one piece stamping with "V" shaped cutting edges on each opposite ends. The disposable blade is mounted on the original cutting blade such that original blade is placed within the inner side of the V-shaped cutting edge. The cutting and wear is on the V-shaped cutting edges of the disposable blade, which can be installed and removed in seconds without the use of tools.

1 Claim, 2 Drawing Sheets

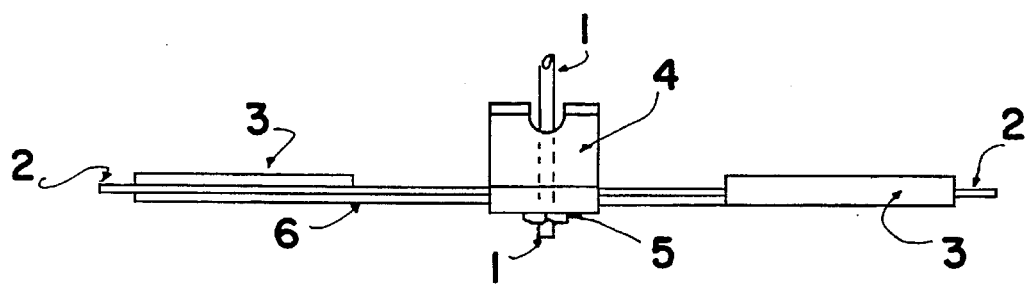
FIG. 1
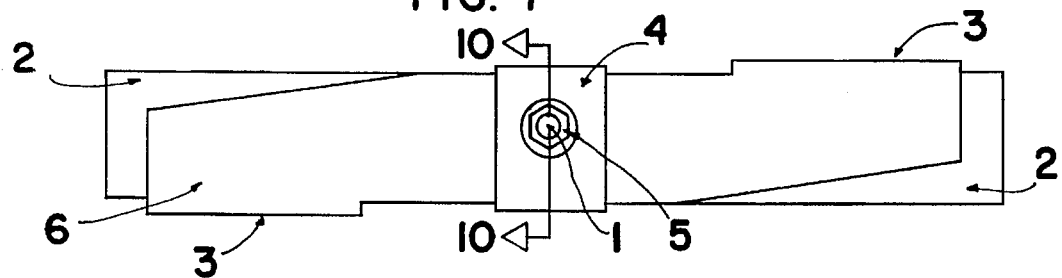
FIG. 2
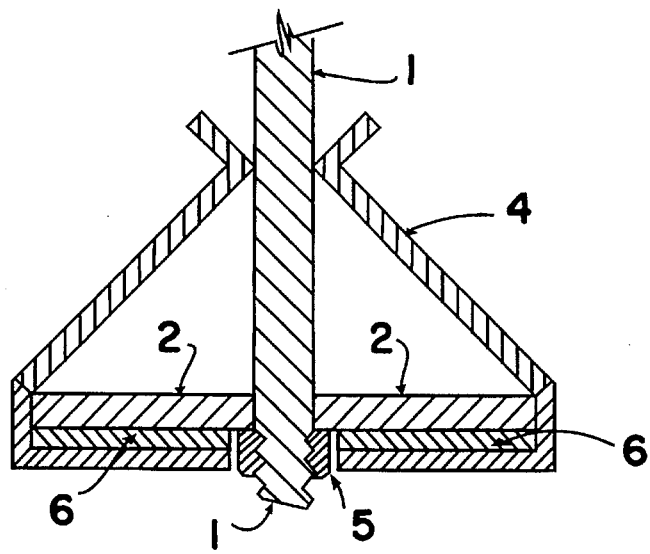
FIG. 3 — SECT. 10-10
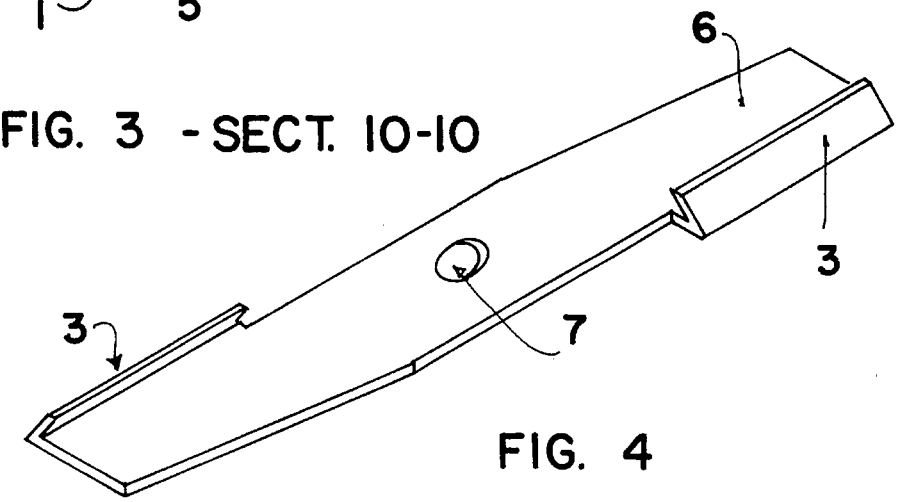
FIG. 4

DISPOSABLE LAWN MOWER BLADE

BACKGROUND OF THE INVENTION

Presently, the method of keeping a sharp edge on a rotary lawn mower blade, for the general public, is to deliver the entire lawn mower to a repair person. He, in turn, removes the blade, requiring tools that most homeowners do not possess or if they did would not have the dexterity to do so. The repair person chucks the blade into a vice and with a rotary grinder grinds both cutting edges to a suitable sharp condition, then reverses the process for replacing the blade. Next, the owner returns to the repair shop. The mower is placed into the home owners automobile trunk, drives home and has to lift the mower out of the trunk by themselves. After having been required to perform this laborious task, especially for the senior citizen, as well as having to pay a considerable fee for the service, the same must be repeated some months later.

DESCRIPTION OF PRIOR ART

There are many short comings of this known method. They all require the removal of the original hardened steel blade, some require blade reconstruction and additional costs involved in the manufacturing of the cutting edges due to the complication of the design. In addition, each time a new edge is installed the blade must be removed on most designs and reinstalled. Some require the use of tools, an unhandy device in the hands of many. These factors, I believe, have contributed greatly to the lack of commercial success on the part of these REPLACEABLE blades.

SUMMARY OF THE INVENTION

The present invention is a disposable blade which is attached or removed in seconds, on the original blade, just as a razor blade is removed and replaced with a new one.

It is the object of my invention to make is easier and less expensive for anyone, in particularly the elderly, to perform the task of keeping one's property in good order at a cost almost everyone can afford. It is only necessary to lay the mower on its side, place the hole found in the center of the disposable blade over the nut that fastens the hardened original steel blade at a right angle, turn the disposable blade 90 degrees to the right, making certain that the cutting edges of the disposable blade straddle the leading edge of the original steel blade and then place the spring steel safety lock over the nut. For removal, just reverse the installation process. No tools are required, no removing or reconstruction of the original blade is necessary, and no installation or replacement of expensive original blades is required.

BRIEF DESCRIPTION OF THE DRAWINGS

FIG. 1 is a side elevational view of the preferred embodiment of the present invention.

FIG. 2 is the bottom plan view of FIG. 1.

FIG. 3 is an enlarged cross-sectional view taken along line 10—10 of FIG. 2.

FIG. 4 is a perspective view of the preferred embodiment, unmounted.

DETAILED DESCRIPTION OF THE INVENTION

Figure 5:
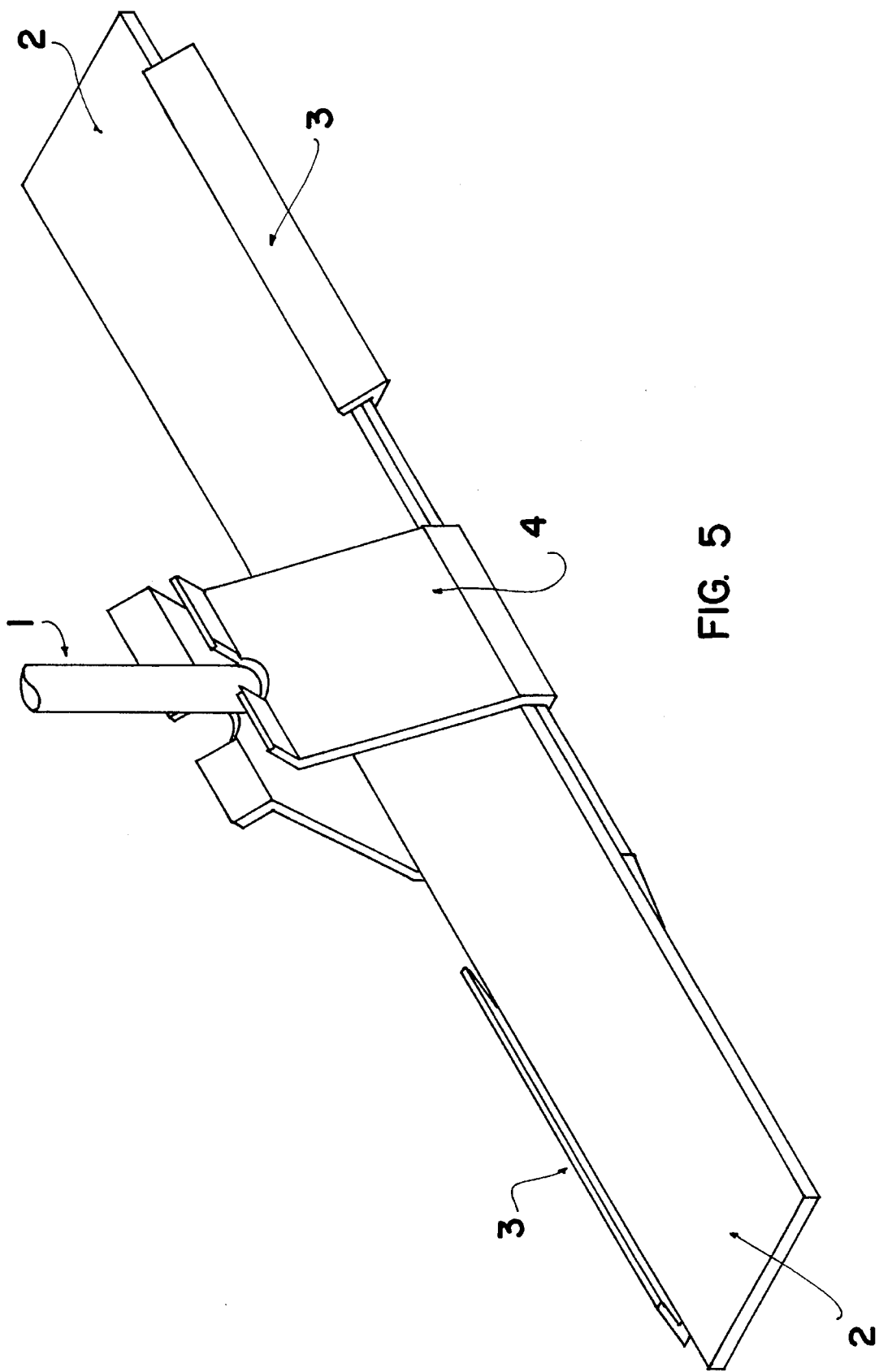
FIG. 5 is a perspective view of the preferred embodiment fastened to the original lawn mower blade.

FIG. 1 shows a side view of the DISPOSABLE blade when attached to the original blade. The crankshaft 1 extends through the center holes of the original steel blade 2 and the disposable blade 6. FIG. 4 shows just disposable blade 6 having razor blade edges 3 being V-shaped such that a first leg of the V is co-planar with the plate and the other leg extends at an acute angle with the first leg. The V-shaped edges are place on each side of the blade at opposite axial ends, extending from the end radially inwardly toward the longitudinal center of the blade for a desirable length. A fastening nut 5 secures the original blade to the crankshaft 1. The center hole 7 of the disposable blade is sufficiently sized such that the hole fits over the fastening nut 5. A spring clip 4 is then used to fasten the center portion of the disposable blade to the original blade 2. The spring clip requires no tools for assembly and holds the disposable blade securely around the original blade fastening nut at the longitudinal center.

FIG. 2 depicts the bottom of the disposable blade assembly. The mounting of the disposable blade 6 to the original blade assembly is simply a matter of holding the disposable blade 6 at a right angle to the original blade 2, placing the center hole 7 over the original blade fastening nut 5 and turning the disposable blade 90 degrees to the right, making certain that the inner side of the "V" shaped cutting edges 3 straddle the original blade 2. The centrifugal force of the original blade against the inner side of the "V" shaped edges holds the two blades in place. The spring clip 4 is then opened and the center is placed over nut 5 and pushing up into place, locking the spring clip over both the disposable blade 6 and original blade 2.

In FIG. 3 shows the spring clip 4 after having been place around nut 5 securing the disposable blade 6 to original blade 2. FIG. 5 shows the present invention property placed over the original blade 2 showing the two cutting edges 3, the steel spring clip 4 and crankshaft extension 1.

The present invention is safe to use as it is fastened in three locations to the original blade, one on each axially opposed "V" shaped cutting edges which holds the original blade with centrifugal force. A third holding position is seen as the spring steel clip placed in the center of the unit with its bottom hole placed over the original blade locking nut, securing all parts as one integral unit.

The present invention is also less expensive to manufacture than prior art blades, easy to install, easy to remove and above all, safe to use.

I claim:

1. A cutting assembly for use in a lawn mower having an original bar-type cutting blade having side edges and a longitudinal center, mounted on a vertical rotatable shaft, comprising:

a disposable blade made of a thin plate, the disposable blade having side edges, each side edge having a cutting portion disposed at opposite longitudinal ends, each cutting portion being V-shaped such that a first leg of the V-shaped cutting portion is co-planar with the plate and the other leg extends at an acute angle with the first leg and the apex creates a cutting edge, the V-shaped cutting portion also having an inner side facing away from the cutting edge; and a center spring clip having a center hole; wherein the disposable blade is mounted on the original blade such that the side edges of the original blade abut the inner side of the V-shaped cutting portion and the spring clip is mounted at the longitudinal center of the original blade and the disposable blade to lock the blades from rotational movement relative to each other.

* * * * *